United States Patent [19]

Folschweiler

[11] Patent Number: 4,562,606
[45] Date of Patent: Jan. 7, 1986

[54] METHOD OF PRODUCING FOOTWEAR WELT

[75] Inventor: Serge Folschweiler, Batawa, Canada

[73] Assignee: Bata Industries Limited, Batawa, Canada

[21] Appl. No.: 424,249

[22] Filed: Sep. 27, 1982

[51] Int. Cl.$^4$ .................. A43C 13/08; B29H 07/08
[52] U.S. Cl. .......................... 12/142 RS; 12/142 T; 264/244
[58] Field of Search ........... 12/142 P, 142 RS, 142 T, 12/146 W; 264/244

[56] References Cited

U.S. PATENT DOCUMENTS

| | | | |
|---|---|---|---|
| 3,949,040 | 4/1976 | Drab | 264/244 |
| 4,024,652 | 5/1977 | Brilli | 264/244 |
| 4,245,406 | 1/1981 | Landay et al. | 264/244 |
| 4,302,416 | 11/1981 | Rudolf et al. | 264/244 |
| 4,407,034 | 10/1983 | Ralphs | 12/142 RS |

Primary Examiner—Werner H. Schroeder
Assistant Examiner—Steven N. Meyers

[57] ABSTRACT

A two-layer sole is molded onto the bottom of a lasted upper by molding a first color outer sole with a recess in the top thereof, molding a second color inner sole to fill the recess. The inner sole including a flange which covers the outer sole and extends slightly outwardly from the periphery thereof between the outer sole and the upper, coloring the flange a third color, and removing a portion of the flange so that the resulting sole appears to include an outer layer, a midsole and a separate welt.

1 Claim, 4 Drawing Figures

METHOD OF PRODUCING FOOTWEAR WELT

BACKGROUND OF THE INVENTION

1. Field of the Invention

This invention relates to a method of producing a sole for an article of footwear, and in particular to a method of producing a footwear sole with a simulated separate welt.

2. Discussion of the Prior Art

In general, the welt portion of an article of footwear is made separately from the remainder of the article, and attached to the sole at the junction between the sole and upper. Simulated welts have also been molded integral with plastic, e.g. polyvinyl chloride soles, the welts being the same color as the remainder of the sole. It is also possible to dye or paint the top portion of the simulated welt so that the welt appears to be separate from the remainder of the sole.

The object of the present invention is to provide a relatively simple method for producing a two-layer footwear sole with a simulated welt. The finished product has the appearance of a two-layer sole with a separate welt, even though the welt is a portion of the inner layer of the sole.

GENERAL DESCRIPTION OF THE INVENTION

Accordingly, the present invention relates to a method of producing a footwear sole with a simulated welt comprising the steps of:
(a) molding an outer sole portion on a mold bottom;
(b) placing a lasted upper above said outer sole portion and mold bottom;
(c) molding an inner sole portion between said first sole portion and lasted upper to connect the outer sole portion to the upper, with a flange integral with said inner sole portion extending outwardly beyond the periphery of said outer sole portion, said flange including a simulated welt;
(d) coloring said flange between the upper and the outer sole portion; and
(e) removing a portion of said flange, whereby the remainder of the flange resembles a welt and a midsole above said outer sole portion.

BRIEF DESCRIPTION OF DRAWINGS

The invention will now be described in greater detail with reference to the accompanying drawings, which illustrate a preferred embodiment of the invention, and wherein.

DESCRIPTION OF PREFERRED EMBODIMENTS

Figure 1:
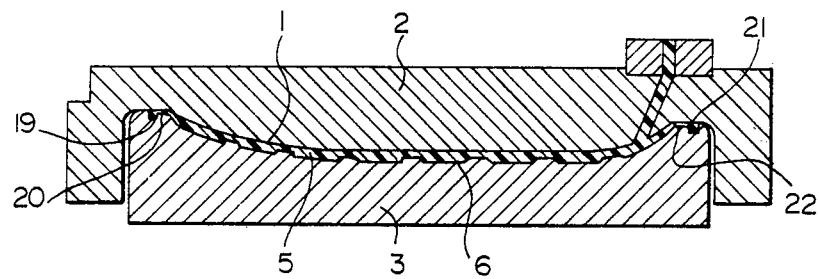
FIG. 1 is a longitudinal sectional view of a mold for molding an outer sole portion.
Figure 2:
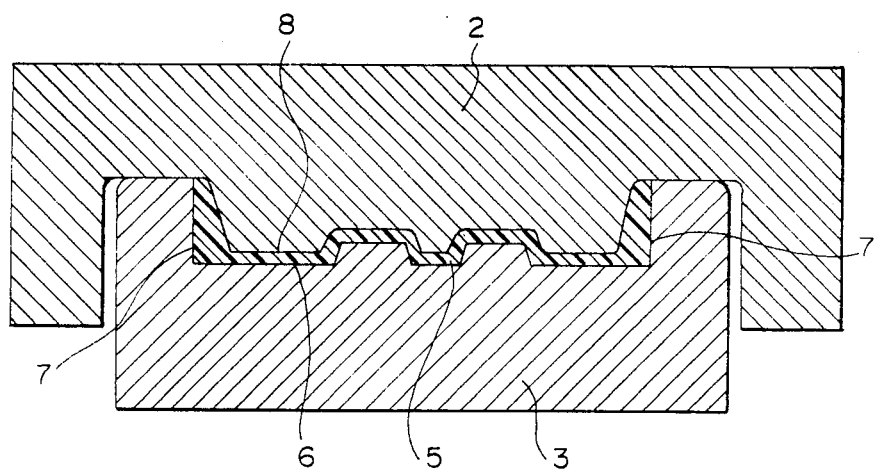
FIG. 2 is a cross-sectional view taken generally along line II—II of FIG. 1.

With reference to FIGS. 1 to 4 of the drawings, a footwear sole is produced using a first mold cavity 1 defined by a top mold 2 and a bottom mold 3, which may be a vertically movable mold piston (FIGS. 1 and 2). The mold cavity 1 is filled with a plastic material such as polyvinyl chloride or polyurethane through injection orifice (not shown) to produce a first or outer sole portion 5. The outer sole portion 5 includes a bottom tread surface 6; a vertical side wall 7 and a cavity 8 in the top thereof. The mold is opened, i.e. the top mold 2 is removed, leaving the bottom mold 3 and the outer sole portion 5 together.

A second mold cavity (FIGS. 3 and 4) is produced using the bottom mold 3 and outer sole portion 5, a pair of side molds 10, and a last 11 with an upper 12 thereon. Plastic material is injected into the second mold cavity to produce an inner sole portion 13 connecting the outer sole portion 5 to the upper 12. The only area of the inner sole portion 13 which appears in the finished product is a flange 14 between the upper 12 and top edge 15 of the outer sole portion 5. The flange 14 is in the shape of a conventional welt, including a convex bead 16 with outwardly extending, generally V-shaped grooves therein, and a rectangular bottom shoulder 17 extending outwardly therefrom. The side molds 10 used to mold the inner sole portion 13 include cavities 18 of sufficient depth that the shoulder 17 projects outwardly beyond the vertical side wall 7 of the outer sole portion 5.

After the article of footwear has been removed from the second mold, the flange 14 is colored, i.e. dyed or painted. Then, the outer peripheral edge of the shoulder 17 projecting outwardly beyond the side wall 7 of the outer sole portion 5 is removed, so that the side edge of the shoulder 17 is flush with the side wall 7 of the outer sole portion 5. If the sole portions 5 and 13, and the paint used on the shoulder 17 are three different colors, the result is a two layer sole with a simulated welt between the top surface of the upper layer and the bottom edge of the upper 12 around the entire periphery of the article of footwear. Thus, the expense of producing and applying a separate welt is avoided.

When the plastic used in the above described method is polyurethane, an expensive cavity 19 must be provided in the bottom mold 3. The cavity 19 extends around the entire periphery of the sole cavity, and prevents the improper molding of the second sole layer. During molding of the outer sole portion 5, the polyurethane expands through a narrow passage 20 into the cavity 19. The polyurethane ring 21 filling the cavity 19 and the thin web 22 of polyurethane connecting the ring 21 to the outer sole portion 5 remain on the bottom mold 3 during molding of the inner sole portion 13 to prevent the entry of the polyurethane of the inner sole portion 13 into the area between the periphery of outer sole portion 5 and the side of the mold cavity in the bottom mold 3. The ring 21 and the web 22 are removed at the same time as the excess portion of shoulder 17.

I claim:

1. A method of producing a footwear sole with a simulated welt comprising the steps of:
(a) molding an outer sole portion on a mold bottom;
(b) placing a lasted upper above said outer sole portion and mold bottom;
(c) molding an inner sole portion between said first sole portion and lasted upper to connect the outer sole portion to the upper, with a flange integral with said inner sole portion extending outwardly beyond the periphery of said outer sole portion, said flange including a profiled top surface defining a simulated welt and a bottom portion with a smooth periphery extending outwardly beyond the simulated welt around the entire periphery of the flange;
(d) coloring substantially the entire flange between the upper and the outer sole portion; and
(e) removing said bottom portion of said flange, whereby the remainder of the flange resembles a welt and a midsole above said outer sole portion, the colours of the welt, midsole and outer sole portion differing from each other.

* * * * *

UNITED STATES PATENT AND TRADEMARK OFFICE
CERTIFICATE OF CORRECTION

PATENT NO. : 4,562,606

DATED : January 7, 1986

INVENTOR(S) : Serge Folschweiler

Figure 3:
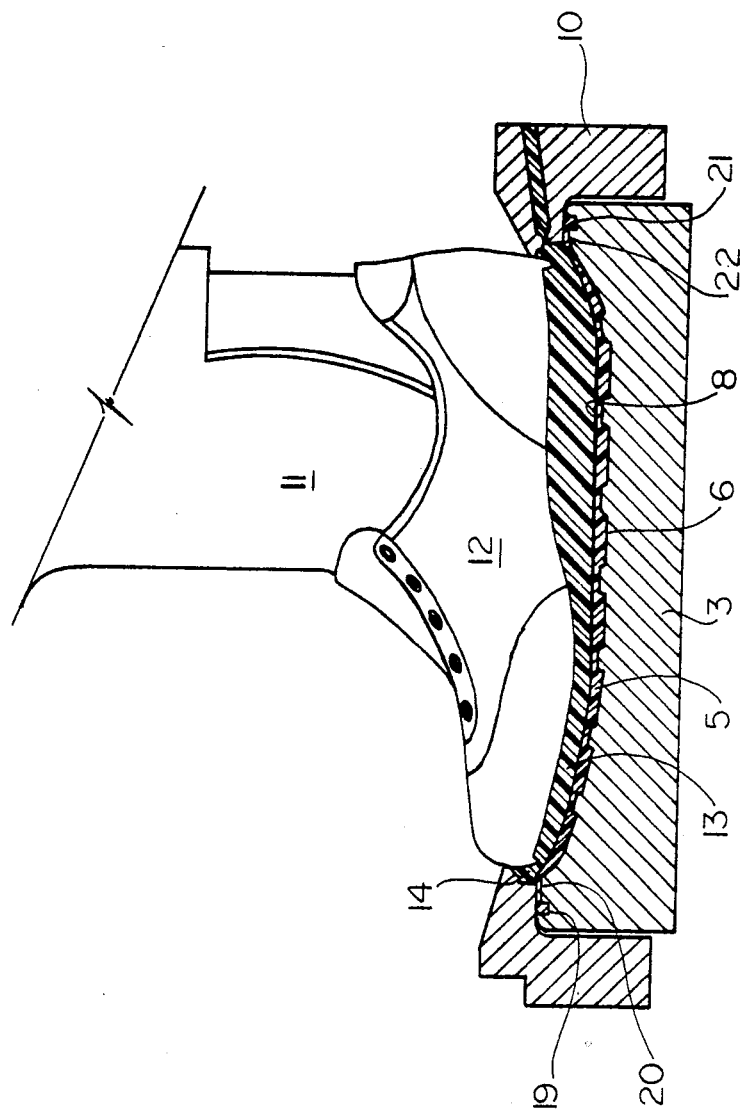
FIG. 3 is a longitudinal sectional view of a mold for producing an inner sole portion.
Figure 4:
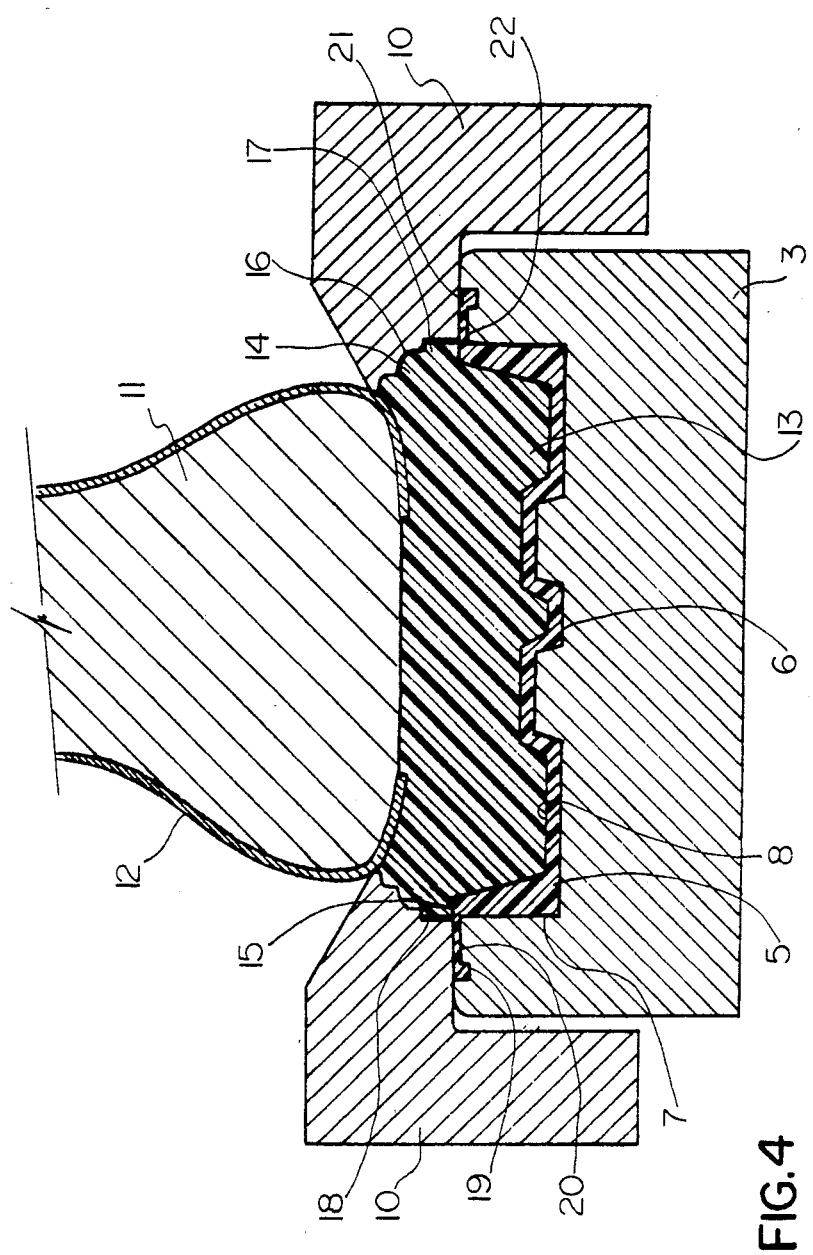
FIG. 4 is a cross-sectional view taken generally along line IV—IV of FIG. 3.
Figure 1:
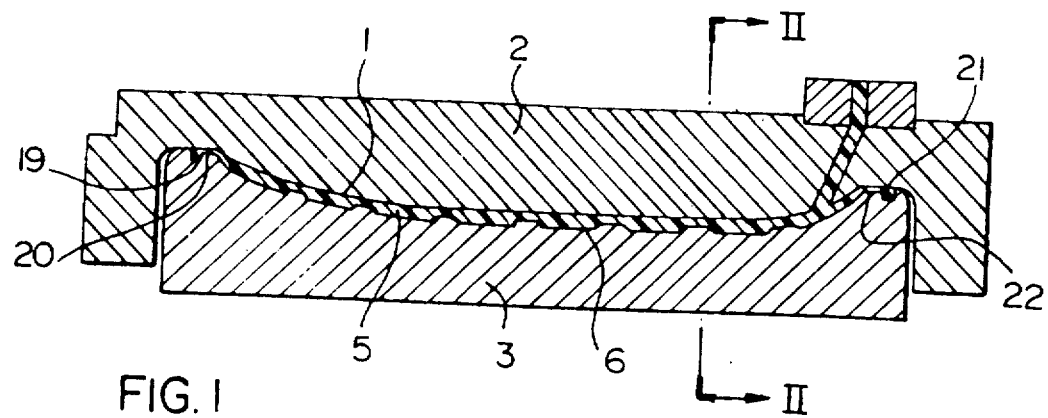
Figure 3:
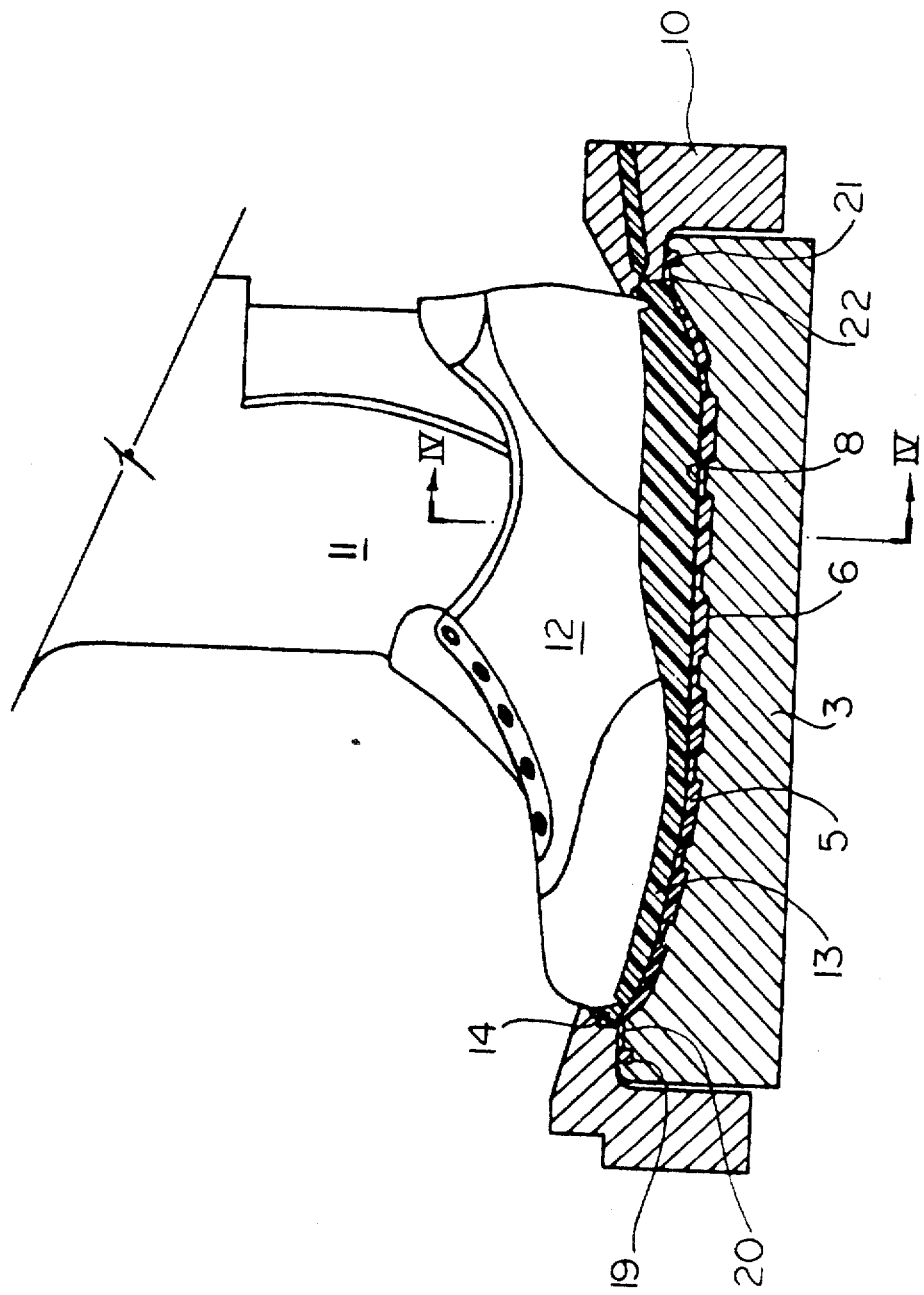

It is certified that error appears in the above-identified patent and that said Letters Patent is hereby corrected as shown below:

Figures 1 and 3 of the drawings should be deleted to appear as per attached figures.

Signed and Sealed this

Twenty-ninth Day of April 1986

[SEAL]

Attest:

Attesting Officer

DONALD J. QUIGG

Commissioner of Patents and Trademarks